(12) United States Patent
Torres et al.

(10) Patent No.: US 9,385,600 B2
(45) Date of Patent: Jul. 5, 2016

(54) LOW-LOSS STEP-UP AND STEP-DOWN VOLTAGE CONVERTER

(71) Applicant: Texas Instruments Incorporated, Dallas, TX (US)

(72) Inventors: Erick Omar Torres, Allen, TX (US); Harish Venkataraman, Wylie, TX (US); Byungchul Jang, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 258 days.

(21) Appl. No.: 14/088,012

(22) Filed: Nov. 22, 2013

(65) Prior Publication Data
US 2015/0145497 A1 May 28, 2015

(51) Int. Cl.
*H02M 3/158* (2006.01)
*H02M 3/07* (2006.01)
*H02M 1/00* (2006.01)

(52) U.S. Cl.
CPC ............... *H02M 3/158* (2013.01); *H02M 3/07* (2013.01); *H02M 3/1584* (2013.01); *H02M 3/1582* (2013.01); *H02M 2001/0048* (2013.01); *Y02B 70/1491* (2013.01)

(58) Field of Classification Search
CPC ............. H01M 2001/0067; H01M 2001/0048
See application file for complete search history.

(56) References Cited

U.S. PATENT DOCUMENTS

| | | | | |
|---|---|---|---|---|
| 5,191,232 A * | 3/1993 | Wang | ..................... | H02M 3/073 327/306 |
| 5,280,420 A * | 1/1994 | Rapp | ..................... | G11C 5/145 363/59 |
| 5,973,944 A * | 10/1999 | Nork | ..................... | H02M 1/44 307/110 |
| 6,157,243 A * | 12/2000 | Tailliet | ..................... | H02M 3/073 327/536 |
| 6,297,687 B1 * | 10/2001 | Sugimura | ..................... | H02M 3/073 323/313 |
| 7,098,633 B1 * | 8/2006 | Brokaw | ..................... | H02M 1/08 323/222 |
| 7,940,031 B2 * | 5/2011 | Kimura | ..................... | H02M 1/36 323/222 |
| 7,940,118 B1 * | 5/2011 | Forghani-Zadeh | ....... | G05F 1/56 327/536 |
| 2002/0033725 A1 * | 3/2002 | Taito | ..................... | H02M 3/07 327/291 |
| 2002/0089889 A1 * | 7/2002 | Ishii | ..................... | G11C 16/30 365/226 |
| 2004/0252434 A1 * | 12/2004 | Mori | ..................... | H03K 17/0822 361/93.1 |
| 2005/0007178 A1 * | 1/2005 | Fahim | ..................... | H03K 17/063 327/390 |

(Continued)

*Primary Examiner* — Timothy J Dole
*Assistant Examiner* — Yusef Ahmed
(74) *Attorney, Agent, or Firm* — John R. Pessetto; Frank D. Cimino

(57) ABSTRACT

A switch-mode DC-DC voltage converter including a boost stage in the form of a charge pump and a buck stage. Control circuitry is provided that enables the operation of the buck stage while the charge pump stage is also enabled, followed by disabling of the charge pump stage as the input voltage and output voltage increase. The buck converter stage is constructed so that it regulates the output voltage at a voltage above that which disables the charge pump stage. Conduction losses in the main current path, due to the necessity of a power FET or other switching device, are avoided.

7 Claims, 6 Drawing Sheets

(56) References Cited

U.S. PATENT DOCUMENTS

| | | | |
|---|---|---|---|
| 2005/0110560 A1* | 5/2005 | Kim | H02M 3/07 327/536 |
| 2006/0139074 A1* | 6/2006 | Doi | H02M 3/07 327/157 |
| 2007/0090871 A1* | 4/2007 | Kwak | H02M 3/07 327/536 |
| 2007/0210755 A1* | 9/2007 | Gangstoe | H02J 7/0031 320/128 |
| 2007/0210774 A1* | 9/2007 | Kimura | H02M 1/36 323/282 |
| 2008/0024198 A1* | 1/2008 | Bitonti | H02M 3/07 327/536 |
| 2008/0111598 A1* | 5/2008 | Yanagigawa | H02M 3/073 327/157 |
| 2008/0111605 A1* | 5/2008 | Yoshikawa | H03K 17/22 327/198 |
| 2008/0284383 A1* | 11/2008 | Aas | H02J 7/0031 320/164 |
| 2009/0315598 A1* | 12/2009 | Namekawa | H02M 3/073 327/157 |
| 2010/0156518 A1* | 6/2010 | Hoque | H02M 3/07 327/538 |
| 2011/0133820 A1* | 6/2011 | Pan | H02M 3/073 327/536 |
| 2012/0300552 A1* | 11/2012 | Neto | H02M 3/073 365/185.18 |
| 2013/0148456 A1* | 6/2013 | Cho | G11C 5/145 365/226 |

* cited by examiner

US 9,385,600 B2

LOW-LOSS STEP-UP AND STEP-DOWN VOLTAGE CONVERTER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of voltage converters. Embodiments of the invention are more specifically directed to DC-DC switch-mode voltage converters, such as are used in DC power supplies and DC motor drive applications, and the like.

Voltage converter circuits are common components of many electrical and electronic systems having loads that are to be driven by regulated DC voltages. For example, many electronic systems include integrated circuits and other loads that require a relatively stable DC voltage. As such, these systems typically include a DC power supply for converting unregulated DC input power received from a battery, or from an AC line voltage via a rectifier, into a stable regulated DC power output to be applied to the integrated circuit or other system loads, such as a DC motor.

One common type of DC-DC voltage converter circuit that is commonly included in DC power supplies is referred to in the art as the switch-mode DC-DC voltage converter. As known in the art, switch-mode DC-DC "buck" converters (or "step-down" converters) produce an output voltage that is lower, on average, than its input voltage, while "boost" converters (or "step-up" converters) produce an output voltage that is higher, on average, than its input voltage. Modern conventional regulated DC power supplies often include a switch-mode DC-DC converter of a "buck-boost" topology, which is effectively a combination of the "buck" and "boost" converter circuit types. Buck-boost voltage converters are capable of producing an output voltage that may be either higher or lower than the received input voltage.

FIG. 1 is a schematic diagram of conventional non-inverting buck-boost DC-DC voltage converter 2. As typical in the art, the voltage at input terminal IN is applied, via switch SW1, to one end of inductor 4. That same end of inductor 4 is also coupled to ground through switch SW2. The other end of inductor 4 is itself coupled to ground through switch SW3; this node is also coupled, via switch SW4, to one plate of capacitor 6 and to load LD, at output terminal OUT. Capacitor 6 is connected across output terminal OUT and ground. Switches SW1 through SW4 are typically constructed as power field-effect transistors (FETs), with their gates controlled by control logic (not shown).

In the operation of voltage converter 2 as a "buck-boost" converter, switches SW1 and SW3 are periodically switched open and closed together, while switches SW2 and SW4 are periodically switched open and closed together but complementary to switches SW1 and SW3. Typically, a "dead" time is enforced between switching transitions, to avoid the crowbar condition of switches SW1 and SW2 both being closed at the same time. During those portions of the cycle in which switches SW1 and SW3 are closed (and switches SW2 and SW4 are open), inductor 4 is energized from input terminal IN. During those portions of the cycle in which switches SW2 and SW4 are closed (and switches SW1 and SW3 are open), the energy stored by inductor 4 is delivered to load LD, with capacitor 6 serving as a filter capacitor to reduce ripple at output terminal OUT.

However, as noted above, switches SW1 through SW4 are typically implemented as power FETs. In most applications, these power FETs are necessarily relatively large, particularly for those cases in which power converter 2 is implemented in a DC power supply or in a DC motor drive application. Because each of these switches SW1 through SW4 are switched twice per cycle, the switching losses in these power FETs can be significant. In addition, conduction losses through these power FETs increase with increasing levels of output current required of voltage converter 2.

To minimize switching losses due to the power FETs used to realize switches SW1 through SW4, voltage converter 2 may be operated in separate "buck" and "boost" modes, rather than as a buck-boost converter in which all switches SW1 through SW4 switch twice per cycle. These separate operating modes are enforced by control logic that controls the states of switches SW1 through SW4, according to a comparison of output voltage Vout to a reference voltage (e.g., the desired output voltage level) at which it switches the mode of operation. According to this style of operation, voltage converter 2 is generally controlled to operate in its boost mode during such time as the input voltage is relatively low (e.g., below a reference voltage), and to operate in its buck mode during such time as the input voltage is relatively high (e.g., above the reference voltage).

FIG. 2a illustrates the operation of voltage converter 2 in its boost mode. In this boost mode, control logic (not shown) holds switch SW2 open at all times, and holds switch SW1 closed at all times. This control logic also controls switches SW3 and SW4 to open and close in a complementary manner, typically with a dead time between transitions to avoid crowbar situations. In operation, inductor 4 is energized from input terminal IN during those portions of the cycle during which switch SW3 is closed and switch SW4 is open. During the opposite portions of the cycle during which switch SW4 is closed and switch SW3 is open, the energy stored by inductor 4 is delivered to capacitor 6 and load LD, raising the voltage at output terminal OUT. The duty cycle of switches SW3, SW4 determine the voltage at output terminal OUT; the desired level of output voltage Vout is generally above the voltage at input terminal IN, as known in the art.

Conversely, FIG. 2b illustrates the operation of voltage converter 2 in its buck mode. In this mode, control logic holds switch SW4 closed and switch SW3 open, while switches SW1 and SW2 are switched open and closed in a complementary manner, again with a dead time enforced to avoid crowbar. During such time as switch SW1 is closed and switch SW2 is open, inductor 4 is energized by current from input terminal IN. Conversely, during such time as switch SW1 is open and switch SW2 is closed, the current stored by inductor 4 is applied to load LD. Capacitor 6 operates effectively as a filter capacitor, reducing ripple in output voltage Vout at load LD. Again, the duty cycle of switches SW1, SW2 determines the voltage at output terminal OUT; the desired output voltage is generally below the voltage at input terminal IN in this buck mode operation of voltage converter 2.

However, in the buck configuration of FIG. 2b, the power FET implementing switch SW4 is closed so long as power converter 2 is operated in this mode, presenting a resistance that is directly in the high current path between inductor 4 and load LD. Particularly in applications of power converter 2 in which boost mode operation (FIG. 2a) is enabled for only a brief period of time such as during system power-up (and in which the current requirements of load LD are generally quite low), power converter 2 will largely be operated in the buck configuration. The resistance losses through the power FET implementing the always-closed switch SW4 in the buck mode can be quite significant.

BRIEF SUMMARY OF THE INVENTION

Embodiments of this invention provide a switch-mode DC-DC voltage converter that is operable in step-down ("buck") and step-up ("boost") modes, and in which resistance losses are significantly reduced over conventional voltage converters.

Embodiments of this invention provide such a voltage converter in which boost mode switching current is minimized when no longer required.

Embodiments of this invention provide such a voltage converter providing smooth transitions between its step-up and step-down modes of operation, and vice versa.

Other objects and advantages of embodiments of this invention will be apparent to those of ordinary skill in the art having reference to the following specification together with its drawings.

Embodiments of this invention may be implemented into a voltage converter including a buck converter stage and a charge pump stage connected in parallel between an input terminal and an output terminal. The voltage converter includes control circuitry that disables the charge pump stage upon the output voltage reaching a first output voltage level, and that controls the buck converter stage to regulate the output voltage level at a second output voltage level above the first output voltage level.

DETAILED DESCRIPTION OF THE INVENTION

This invention will be described in connection with its embodiments, namely as implemented into a switch-mode DC-DC voltage converter realized in an integrated circuit. It is to be understood that the following description is provided by way of example only, and is not intended to limit the true scope of this invention as claimed.

Figure 3:
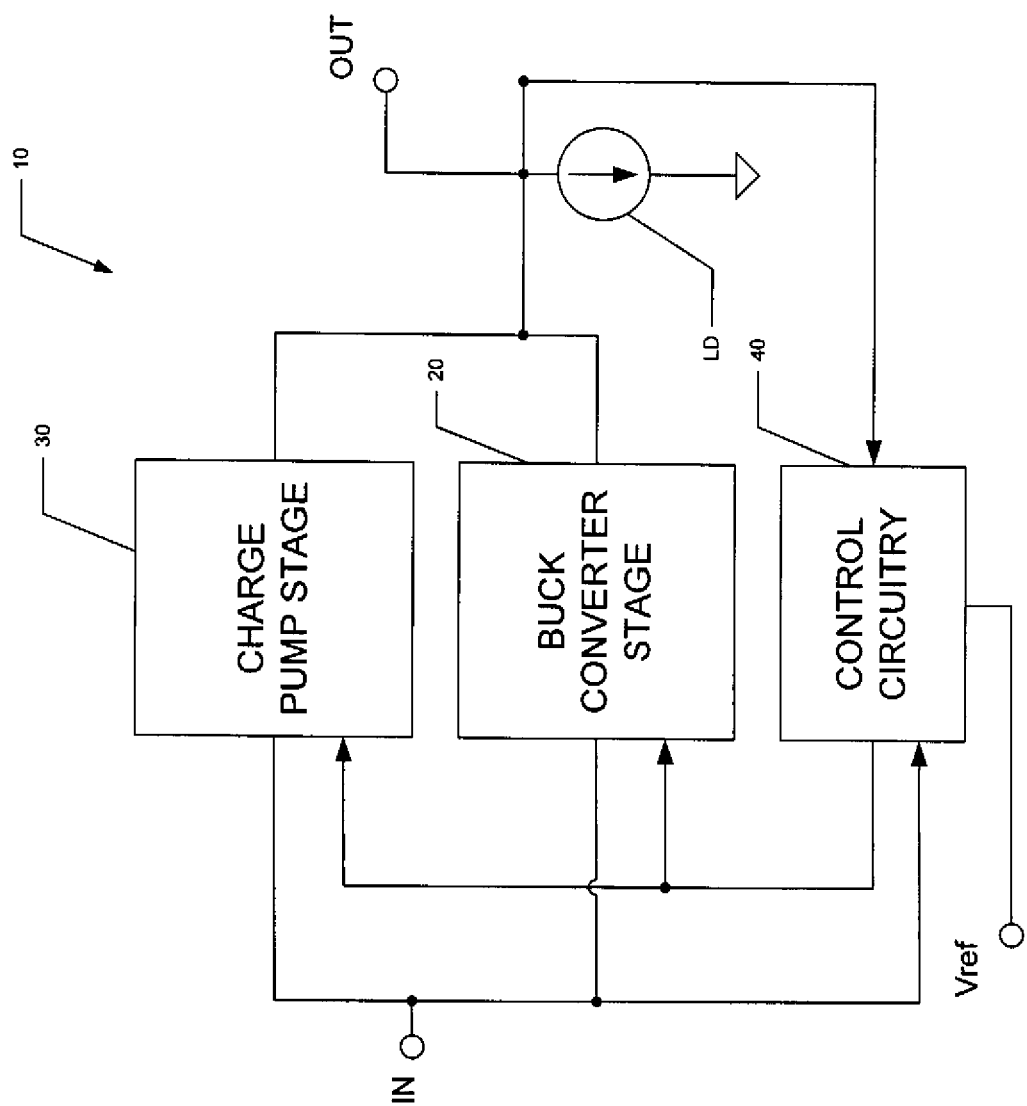
FIG. 3 is an electrical diagram, in block form, of a voltage converter according to embodiments of the invention.

FIG. 3 illustrates, in a general sense, the construction of switch-mode DC-DC voltage converter 10 according to embodiments of the invention. As mentioned above, it is contemplated that voltage converter 10 will typically be realized in a monolithic integrated circuit, generally embedded within a larger-scale integrated circuit along with other functions, but alternatively as a stand-alone integrated circuit. Alternatively, it is contemplated that some or all of the components of voltage converter 10 may be realized by discrete components. As shown in FIG. 3, voltage converter 10 includes a step-down converter in the form of buck converter stage 20, and a step-up converter in the form of charge pump stage 30, each of which receive input terminal IN and are coupled to output terminal OUT at which load LD may be connected. As evident from FIG. 3, buck converter stage 20 and charge pump stage 30 are connected in parallel with one another between input terminal IN and output terminal OUT. Control circuitry 40 has inputs receiving the voltage at output terminal OUT as well as the voltage at input terminal IN, and operates to control the operation of buck converter stage 20 and charge pump stage 30 as will be described below. In some embodiments of the invention, control circuitry 40 also receives one or more reference voltages Vref, for use in its control of stages 20, 30.

In its general operation, control circuitry 40 enables charge pump stage 30 to boost the voltage at output terminal OUT as the voltage at input terminal IN powers up. At relatively low input terminal IN voltages, buck converter stage 20 is disabled by control circuitry. As the voltage at terminal IN rises to above a certain threshold level, control circuitry 40 enables buck converter stage 20 to begin regulating the voltage at output terminal OUT. According to embodiments of the invention, the level at which buck converter stage 20 regulates the voltage at output terminal OUT is higher than the output voltage level at which control circuitry 40 disables charge pump stage 30. This overlap between buck converter stage 20 and charge pump stage 30, during which both stages 20, 30 are charging output terminal OUT, enables a smooth transition between the two modes of charge pump operation and buck converter operation.

The construction and operation of an example of voltage converter 20 according to a particular embodiment of the invention will now be described in detail, with reference to FIGS. 4 and 5.

Figure 4:
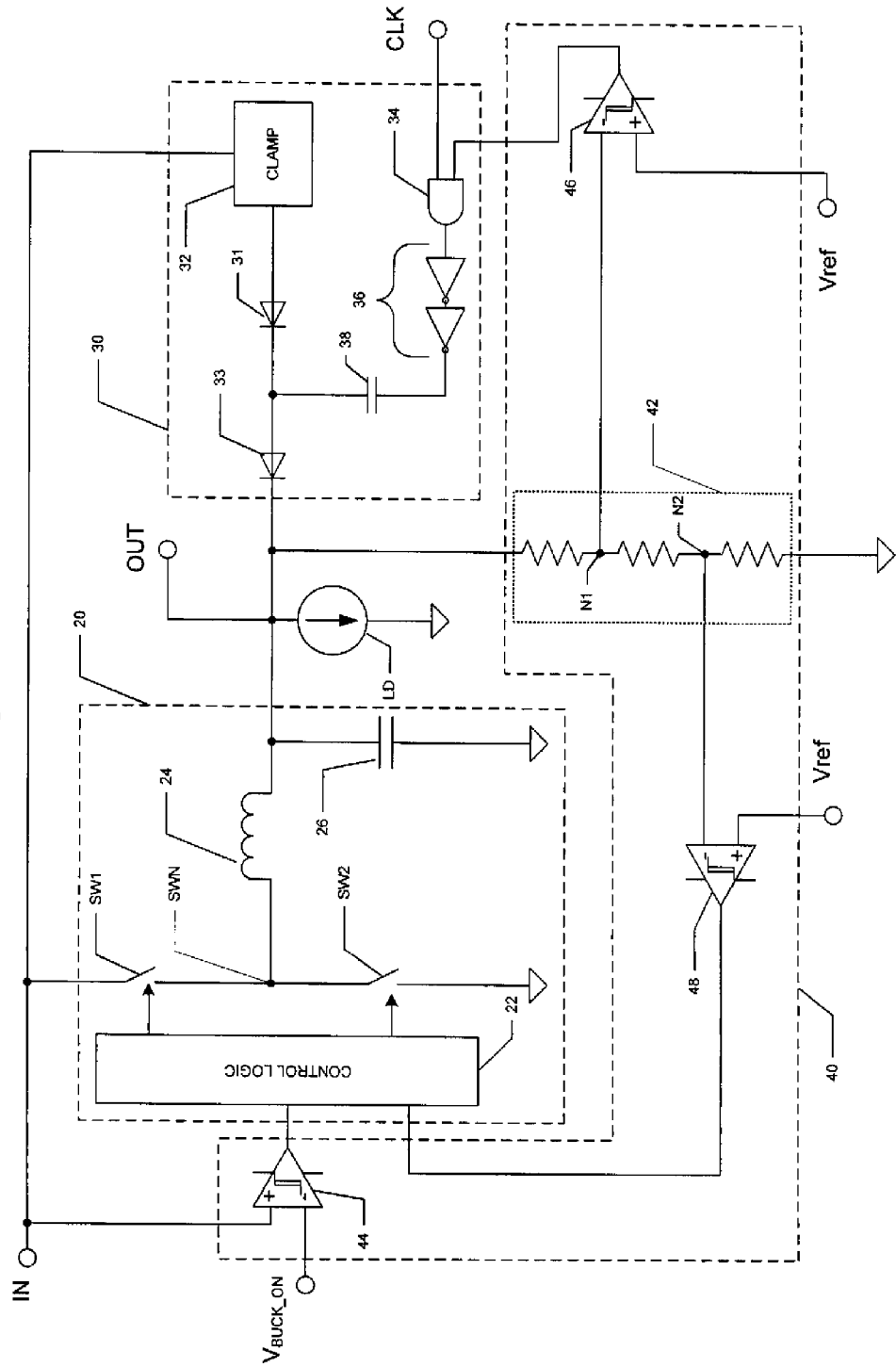
FIG. 4 is an electrical diagram, in schematic form, of a voltage converter according to an embodiment of the invention.

As shown in FIG. 4, buck converter stage 20 is constructed in a conventional manner for buck mode voltage converters. In this implementation, switches SW1, SW2 are connected in series between input terminal IN and ground. As typical in the art, switches SW1, SW2 are each constructed as power FETs, with their source-drain paths connected in series, and their gates controlled by control logic 22. The particular construction of switches SW1, SW2 may follow any one of a number of conventional configurations, including that of a single FET, back-to-back paired FETs, and the like. Switch node SWN, at the common node between switches SW1, SW2, is connected to one end of inductor 24, the other end of which is connected to output terminal OUT. Filter capacitor 26 is connected between output terminal OUT and ground, in the conventional manner. As evident from FIG. 4, no switching transistor is connected in series with inductor 24 between switch node SWN and output terminal OUT in this embodiment of the invention.

Control logic 22 of buck converter stage 20 corresponds to conventional logic as used in buck mode voltage converters, but may be selectively enabled by control circuitry 40 according to this embodiment of the invention, specifically via its comparator 44 as will be described in further detail below. When buck converter stage 20 is enabled, control logic 22 controls the switching of switches SW1 and SW2 in a complementary manner relative to one another, with the appropriate dead time between transitions to ensure both are not closed at the same time. The duty cycle of switches SW1, SW2 will control the voltage at output terminal OUT relative to that at input terminal IN in the conventional manner. Specifically, during such time as switch SW1 is closed and switch SW2 is open, inductor 24 is energized by current from input terminal IN; conversely in this embodiment, during such time as switch SW1 is open and switch SW2 is closed, the current stored by inductor 24 is applied to load LD at output terminal OUT. Capacitor 26 operates effectively as a filter capacitor, reducing ripple in output voltage Vout at load LD. In this embodiment of the invention, the switching duty cycle is controlled by feedback from output terminal OUT via control circuitry 40, specifically via its comparator 48 as will be described in further detail below.

Alternatively, switch SW2 may be replaced by a diode (e.g., with its cathode at switch node SWN and its anode at ground), as known in the art for buck voltage converters. In this case, control logic 22 will control only switch SW1. During those portions of the switching cycle in which switch SW1 is open, current stored by inductor 24 will similarly be applied to load LD at output terminal OUT, in the manner described above. Other alternatives to the construction of buck converter stage 20 are also contemplated.

FIG. 4 also illustrates the construction of charge pump stage 30 according to this embodiment of the invention. In this implementation, input terminal IN is coupled to a diode chain consisting of a pair of diodes 31, 33 coupled in series between input terminal IN and output terminal OUT by way of optional clamp circuit 32, in this example. Clamp circuit 32 is a conventional clamp circuit that limits the voltage to which charge pump stage 30 can boost output terminal OUT, relative to the voltage at input terminal IN. For example, clamp circuit 32 may be realized as a voltage-controlled switch (i.e., transistor circuit) that is closed while the voltage at input terminal IN is below a certain threshold level, and that is open while the voltage at input terminal IN is above that threshold level. While clamp circuit 32 is optional (i.e., the diode chain may be directly connected to input terminal IN), it provides the advantage of limiting current drawn by charge pump stage 30 during normal operation.

The charge pump operation of charge pump stage 30 is driven by clock signal CLK, which is generated elsewhere within the integrated circuit in which voltage converter 10 is realized, or external to that integrated circuit. Clock signal CLK is applied to one input of AND gate 34 (which receives a signal from control circuitry 40 as will be described in detail below), the output of which is applied to buffer chain 36. The output of buffer chain 36 is applied to one side of capacitor 38, the other side of which is connected to a node between diodes 31, 33.

In operation, clock signal CLK is applied to AND gate 34 at the desired frequency and duty cycle. When charge pump stage 30 is enabled (i.e., while control circuitry 40 applies a high logic level to AND gate 34), that clock signal CLK is forwarded by AND gate 34 to buffer chain 36. During portions of the clock cycle in which buffer chain 36 presents a low logic level (i.e., ground) at its output, capacitor 38 charges to a voltage corresponding to the voltage at input terminal IN, less a threshold voltage drop across diode 31 and any voltage drop across clamp circuit 32. As clock signal CLK makes its next transition, buffer chain 36 drives its output to a high level, which "pumps" the voltage at the anode of diode 33 to a yet higher voltage (its charged voltage plus the high level voltage at the output of buffer chain 36), because the voltage across capacitor 38 cannot change instantaneously. Since diode 33 is forward-biased at this time, that higher voltage is applied to output terminal OUT, and is maintained at that level during the opposite phase of clock signal CLK by the action of diode 33. This operation continues so long as charge pump stage 30 remains enabled, to the extent allowed by clamp circuit 32 as described above.

It is contemplated that buck converter stage 20 may alternatively be constructed and operate according to other conventional arrangements of buck voltage converters. Similarly, it is contemplated that charge pump stage 30 may alternatively be constructed and operate according to conventional arrangements of charge pump circuits other than the diode-based two-stage construction described above. Such alternatives and other variations of the particular arrangement of these stages 20, 30, as useful in the construction of voltage converter 10 according to this invention, will be recognized by those skilled in the art having reference to this specification.

As mentioned above in connection with control logic 22 of buck converter stage 20, control circuitry 40 in this embodiment of the invention includes comparator 44, which may be constructed in the conventional manner. In this implementation, comparator 44 receives input terminal IN at its positive input and input reference voltage $V_{BUCK\_ON}$ at its negative input, and has its output coupled to control logic 22. Input reference voltage $V_{BUCK\_ON}$ is a reference voltage generated elsewhere within the integrated circuit in which voltage converter 10 is realized, or external thereto, typically by a conventional bandgap reference voltage circuit or another type of conventional voltage regulator or other reference circuit, as known in the art. Input reference voltage $V_{BUCK\_ON}$, as applied to comparator 44 in this embodiment of the invention, establishes the input voltage at which buck converter stage 20 is enabled. In the example shown in FIG. 4, responsive to input terminal IN being at a voltage above input reference voltage $V_{BUCK\_ON}$, comparator 44 drives its output to a high logic level to enable control logic 22 and buck converter stage 20, specifically by enabling control logic 22 to control switches SW1, SW2 to apply power received at input terminal IN to output terminal OUT via inductor 24, in the manner described above. Conversely, in this embodiment of the invention, when buck converter stage 20 is disabled by comparator 44 in response to the voltage at input terminal IN being below input reference voltage $V_{BUCK\_ON}$, control logic 22 holds both of switches SW1, SW2 open.

Control logic 40 also includes voltage divider 42, which in this embodiment of the invention is constructed by the series connection of resistors between output terminal OUT and a reference supply voltage (e.g., ground). Voltage divider 42 defines two nodes N1, N2 at junctions between its series-connected resistors, with node N1 defined at a point closer to output terminal OUT than node N2. In the arrangement of FIG. 4 according to this embodiment of the invention, in which the voltage at output terminal OUT has a positive polarity relative to ground, the voltage at node N1 will always be higher than the voltage at node N2 for any non-zero voltage at output terminal OUT.

Node N1 is applied to the negative input of comparator 46 in control logic 40, and reference voltage Vref is applied to the positive input of comparator 46. Reference voltage Vref applied to comparator 46 will typically differ from input reference voltage $V_{BUCK\_ON}$ applied to comparator 44, to allow optimization the voltage at which buck converter stage 20 is enabled independently from the regulated output voltages, as will be described below. However, it is not required that these two voltages differ from one another. The output of comparator 46 is applied to one input of AND gate 34. In response to the voltage at node N1 being below reference voltage Vref, the high level at the output comparator 46 enables AND gate 34 to respond to clock signal CLK, thus enabling operation of charge pump stage 30. Conversely, upon the voltage at output terminal OUT rising to a level that brings the voltage at node N1 above reference voltage Vref, comparator 46 issues a low level to AND gate 34, which blocks clock signal CLK from being applied to buffer chain 36 and capacitor 38, effectively disabling charge pump stage 30.

Node N2 in voltage divider 42 is connected to a negative input of comparator 48 in control circuitry 40; the positive input of comparator 48 receives reference voltage Vref, and the output of comparator 48 is coupled to control logic 22 of buck converter stage 20. Comparator 48 of control circuitry 40 operates to modulate the voltage applied to output terminal OUT by buck converter stage 20, by controlling the duty cycle of switches SW1, SW2. In this example, if the voltage at node N2 is below reference voltage Vref, the output of comparator 48 will be at a high level, indicating to control logic 22 that the voltage at output terminal OUT is below its desired regulated level; in response, control logic 22 will control switches SW1, SW2 so as to increase the voltage at output terminal OUT. Conversely, if the voltage at node N2 is higher than reference voltage Vref, the output of comparator 48 is driven low, in response to which control logic 22 controls switches SW1, SW2 so as to allow the voltage at output terminal OUT to fall.

Again, while FIG. 4 illustrates that the same reference voltage Vref is applied to comparators 46 and 48, these comparators 46, 48 may receive different reference voltages. In any case, according to embodiments of this invention, buck converter stage 20 will regulate the voltage at output terminal OUT at a higher voltage than that at which charge pump stage 30 is disabled. This operation is implemented in the example of FIG. 4 by the construction of voltage divider 42 so that the voltage at node N1 is necessarily higher than that at node N2, for the case in which the same reference voltage Vref is applied to both of comparators 46, 48.

Further in the alternative, a comparator similar to comparator 44 may be included in control circuitry 40 to selectively enable charge pump stage 30 in response to the voltage at input terminal IN exceeding an input reference voltage. For example, the output of this comparator could be applied as another input to AND gate 34. As will become evident from the following description, it is desirable that this input voltage at which charge pump stage 30 is enabled will be relatively low (i.e., well below input reference voltage $V_{BUCK\_ON}$), as charge pump stage 30 is intended to begin pumping the voltage at output terminal OUT prior to the enabling of buck converter stage 20.

Figure 5:
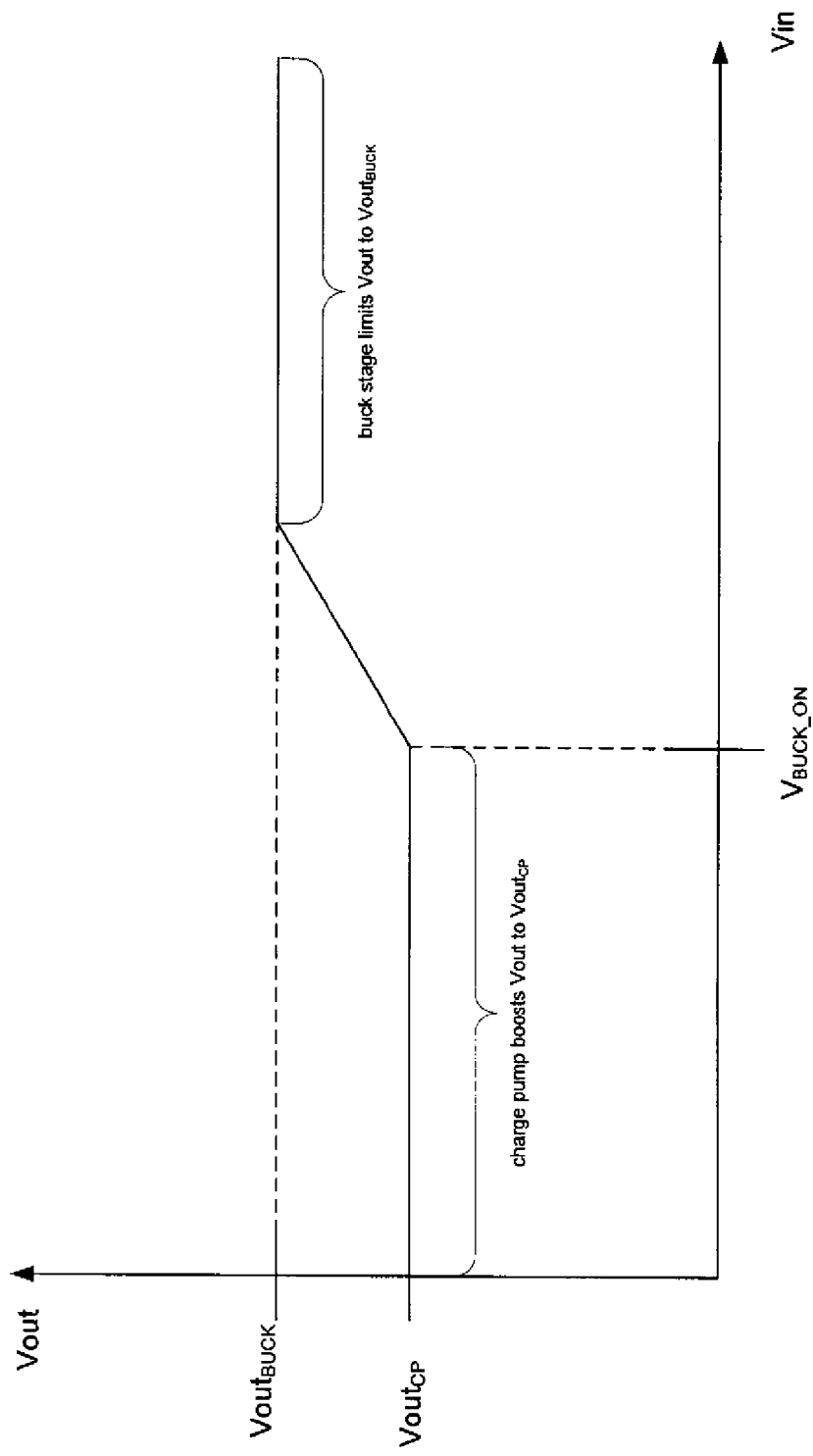
FIG. 5 is a voltage transfer plot illustrating the operation of the voltage converter of FIGS. 3 and 4, according to embodiments of the invention.

Referring now to FIG. 5 in combination with FIG. 4, the operation of voltage converter 10 according to embodiments of this invention will now be described, by way of its transfer function between input voltage Vin (i.e., the voltage at input terminal IN of FIG. 4) and output voltage Vout (i.e., the voltage at output terminal OUT). In particular, this description will refer to a power-up situation in which input voltage Vin is being powered up from a low voltage (e.g., ground) to its eventual steady-state voltage in normal operation. Of course, it is contemplated that those skilled in the art having reference to this specification will be readily able to comprehend the operation of voltage converter 10 under other operating conditions.

Beginning with a low input voltage Vin, control circuitry 40 enables charge pump stage 30 and disables buck converter stage 20. More particularly, for a stable input voltage Vin below input reference voltage $V_{BUCK\_ON}$, comparator 44 presents a low output level to control logic 22, which in turn holds both of switches SW1, SW2 open, and thus disconnects inductor 24 and output terminal OUT from input terminal IN. In this condition, with input voltage Vin at some non-zero level but below input reference voltage $V_{BUCK\_ON}$, charge pump stage 30 is enabled to produce an output voltage Vout at a regulated level $Vout_{CP}$, which is largely determined by the frequency and duty cycle of clock signal CLK. So long as the output voltage at terminal OUT is below the regulated level $Vout_{CP}$, the voltage at node N1 will be below reference voltage Vref, causing comparator 46 to enable charge pump stage 30 to raise the output voltage with cycles of clock signal CLK.

As the power-up process continues, input voltage Vin increases to the level $V_{BUCK\_ON}$, at which point buck converter stage 20 is enabled by comparator 44. Once enabled and operating, buck converter stage 20 will then attempt to regulate output voltage Vout to a voltage $Vout_{BUCK}$, which in this embodiment of the invention corresponds to the output voltage Vout at which the voltage at node N2 matches reference voltage Vref at comparator 48. During this time, both of buck converter stage 20 and charge pump stage 30 are enabled and operating. However, in this embodiment of the invention, voltage $Vout_{BUCK}$ to which buck converter stage 20 will regulate output voltage Vout is higher than voltage $Vout_{CP}$ to which charge pump stage 30 regulates voltage Vout. As a result, buck converter stage 20 will drive the voltage at output terminal OUT above voltage $Vout_{CP}$, which will present a voltage at node N1 above reference voltage Vref. This causes comparator 46 to drive a low level at its output so that AND gate 34 blocks clock signal CLK from buffer chain 36 and capacitor 38, thus disabling charge pump stage 30. Accordingly, at output voltages above voltage $Vout_{CP}$, charge pump stage 30 is disabled. Because charge pump stage 30 (even if enabled) cannot discharge output terminal OUT, buck converter stage 20 will control the output voltage. This manner of operation results in a smooth transition from charge pump operation (i.e., the step-up mode) into the step-down (i.e., buck) mode operation.

As described above, because of the construction of voltage divider 42 and the arrangement of nodes N1, N2, the voltage at node N1 is necessarily higher than the voltage at node N2. With buck converter stage 20 operating, output voltage Vout will eventually reach and be regulated at a level $Vout_{BUCK}$ that corresponds to the voltage at node N2 equaling reference voltage Vref at comparator 48. In this embodiment of the invention, the voltage at node N1 will necessarily be higher than reference voltage Vref, disabling charge pump stage 30. Clamp circuit 32 will also limit current drawn from input terminal IN through diodes 31, 33 at input voltage levels Vin that disable charge pump stage 30. It is contemplated that this operating condition, with buck converter stage 20 regulating output voltage Vout and charge pump stage 30 disabled, will typically be the steady-state condition during normal operation of the integrated circuit in which voltage converter 10 is realized.

However, should input voltage Vin fall to a level below that at which buck converter stage 20 can itself maintain the output voltage Vout, and upon the voltage at node N1 falling below reference voltage Vref, comparator 46 will again enable charge pump stage 30 to boost output voltage Vout.

In summary, therefore, it is contemplated that charge pump stage 30 of voltage converter 10 of this embodiment of the invention will boost the voltage at output terminal OUT during power-up, and during other times at which input voltage Vin is relatively low, which will typically be during low-current operation. As input voltage Vin increases toward its steady-state level, in a higher-current operating state, buck converter stage 20 operates to regulate output voltage Vout at the desired level, with charge pump stage 30 then disabled.

Figure 1:
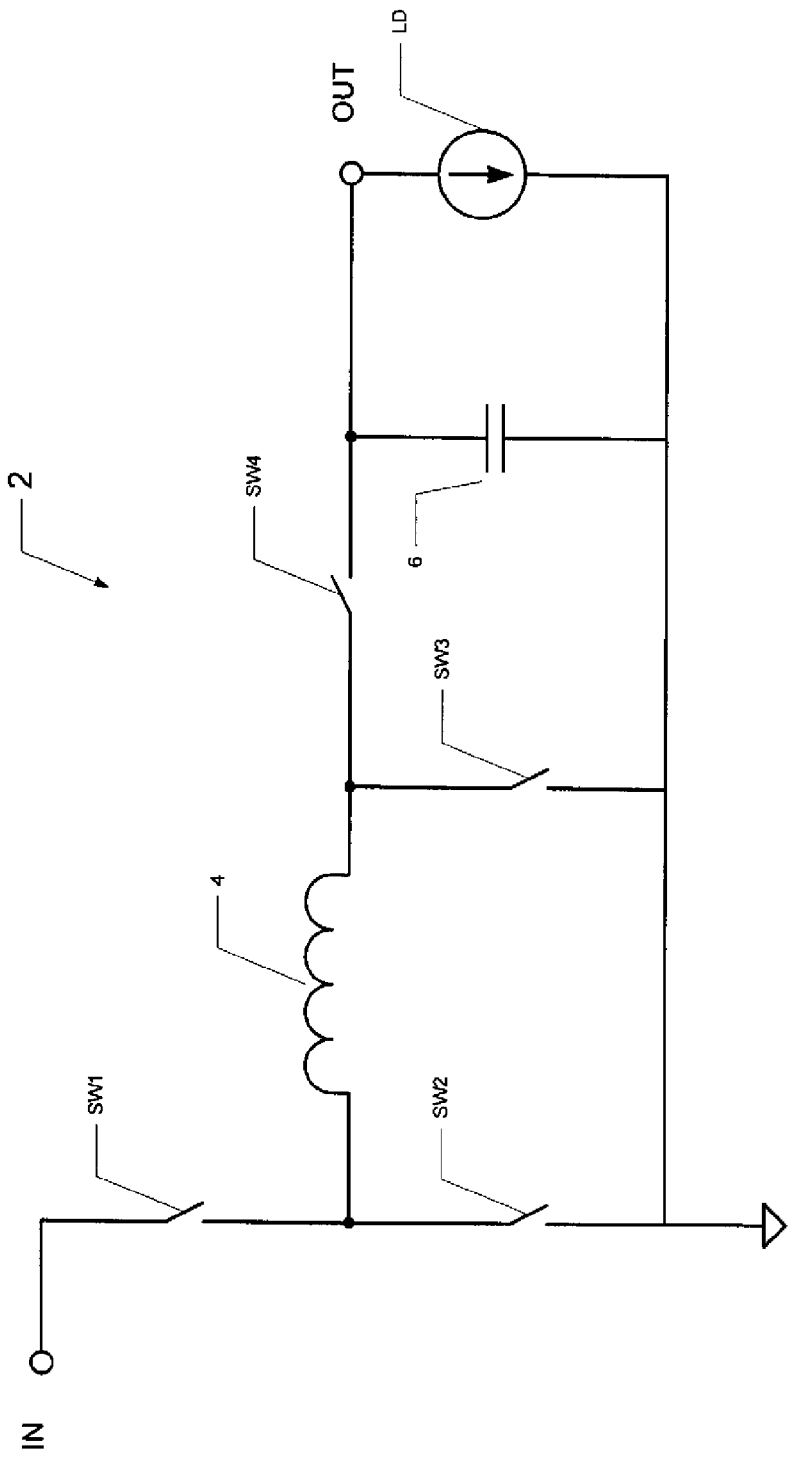
FIG. 1 is an electrical diagram, in schematic form, of a conventional buck-boost voltage converter.
Figure 2A:
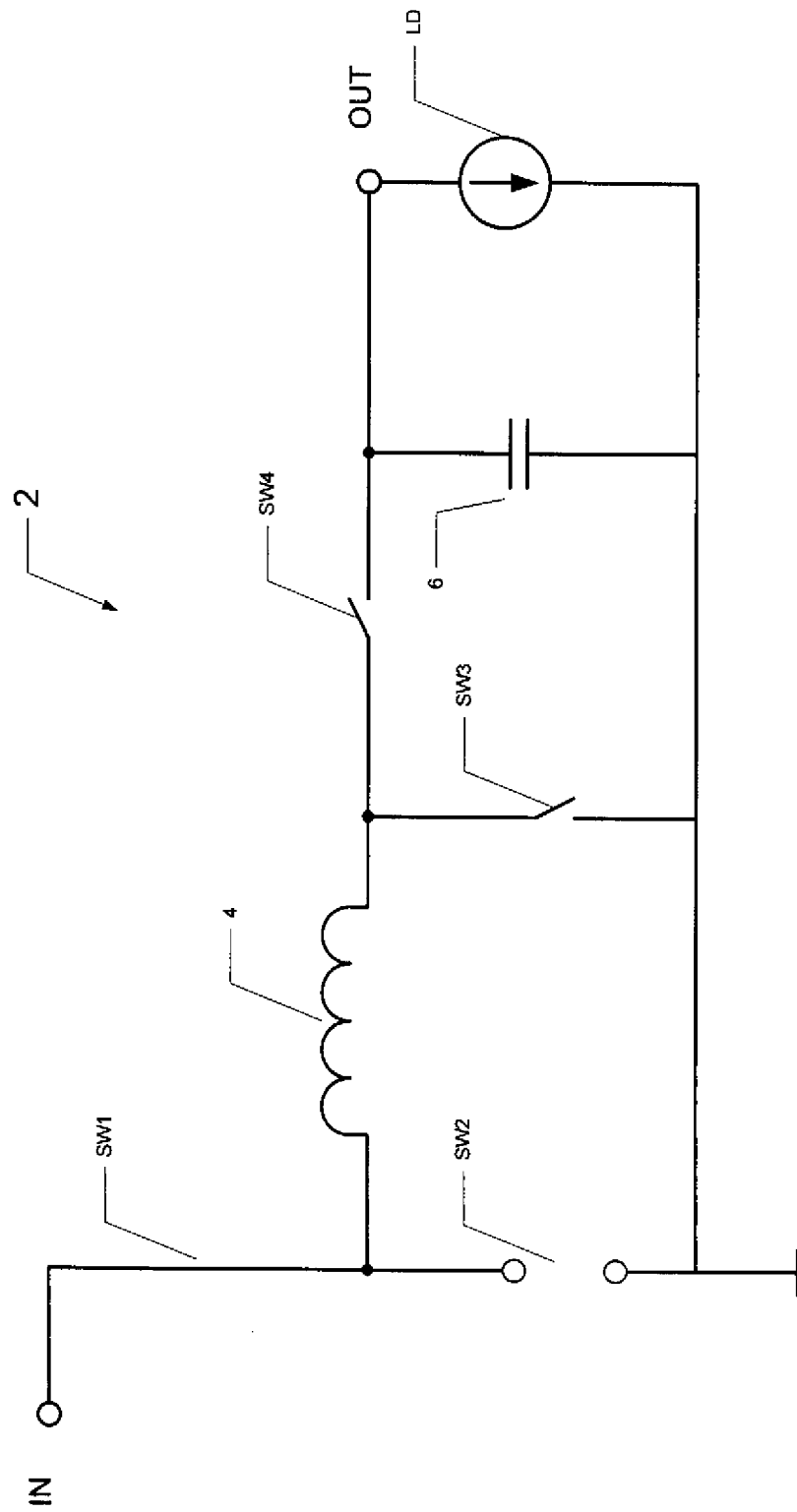
FIGS. 2a and 2b are electrical diagrams, in schematic form, of the conventional buck-boost voltage converter of FIG. 1, when operated in separate boost and buck modes, respectively.
Figure 2B:
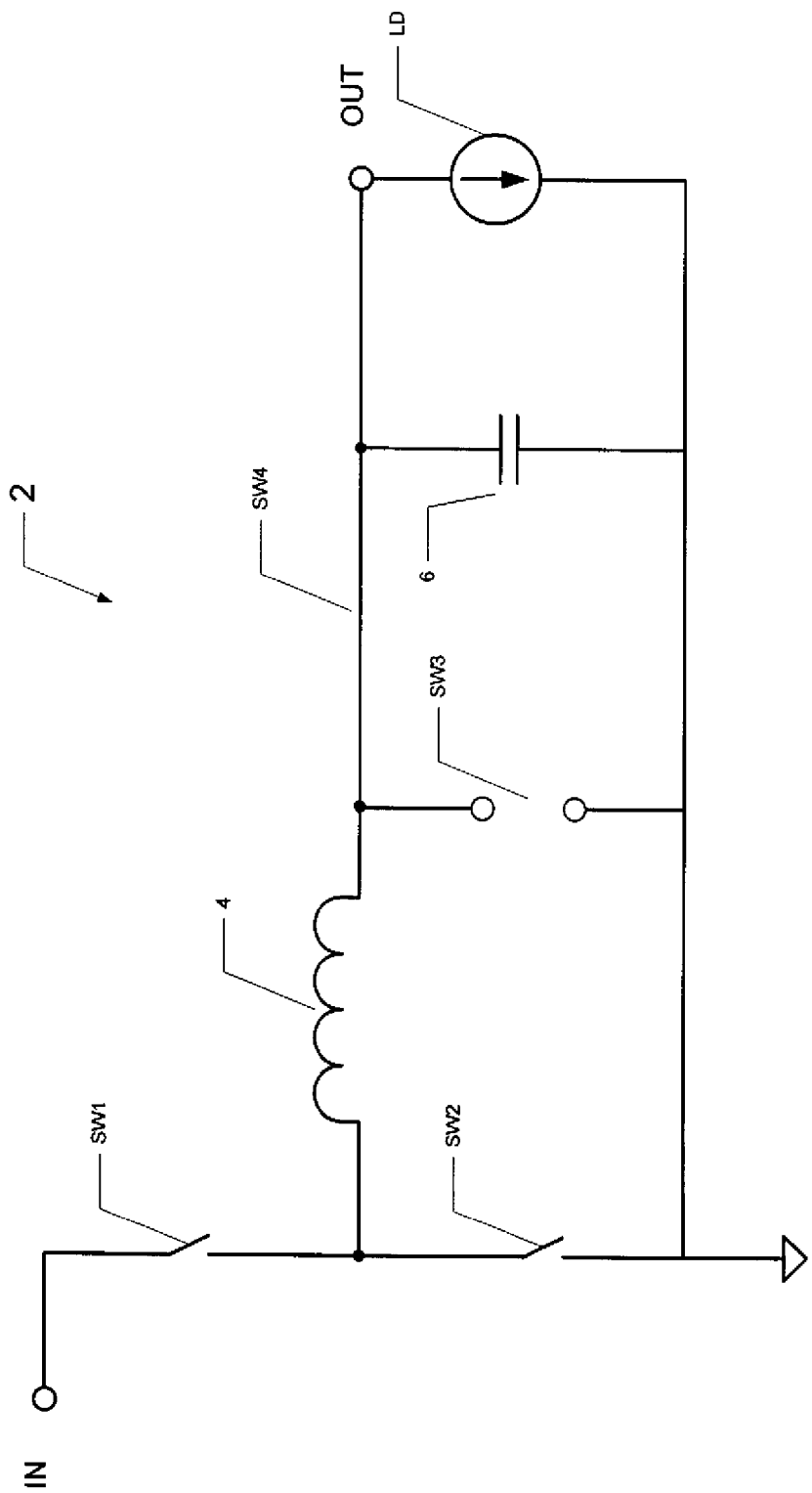

The construction of voltage converter 10 according to embodiments of this invention provides important advantages relative to conventional buck-boost voltage converters such as described above relative to FIGS. 1, 2a, and 2b. In particular, embodiments of this invention provide a voltage converter that is capable of boosting the output voltage above that of the input voltage during low-current operating states, by operation of a charge pump stage, resulting in faster and more efficient development of a desirable output voltage, but without sacrificing conduction losses during the high-current step-down converter operating state. In particular, as shown in the example of FIG. 4, voltage converters according to embodiments of this invention do not include a series power FET or other switching device in the main current circuit branch, including such a power FET or switching device that is held in its closed (i.e., conducting) state during such high-current operation. Accordingly, the conduction losses experienced in conventional buck-boost voltage converters (e.g., switch SW4 of FIGS. 1 and 2b), which can be significant in some implementations, are avoided by embodiments of this invention. This important advantage is accomplished, according to embodiments of this invention, while also providing a smooth transition between the boost and buck operating modes, as described above.

It is contemplated that various alternatives and variations to the embodiments of the invention described above will be apparent to those skilled in the art having reference to this specification. In particular, one such variation is the construction and operation of the voltage converter by applying voltages of the opposite polarity from that described above (e.g., input voltage Vin below the ground voltage, to generate a negative output voltage Vout). In that case, relative terms used in this description and the following claims (e.g., "higher", "lower", "above", "below", and the like) are contemplated to apply with reference to the magnitude of voltages and currents, while comprehending the opposite polarity. These and other alternatives and variations to those described above are contemplated to be within the true scope of this invention as claimed.

While this invention has been described according to one or more of its embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A voltage converter circuit, comprising:
a buck converter stage coupled to an input terminal and to an output terminal, for driving a voltage at the output terminal responsive to an input voltage at the input terminal;
a charge pump stage, coupled to the input terminal and to the output terminal, for driving a voltage at the output terminal responsive to an input voltage at the input terminal; and
control circuitry, for disabling the charge pump stage responsive to the voltage at the output terminal being above a first output voltage level, and for controlling the buck converter stage to regulate the output voltage at a second output voltage level, wherein the second output voltage level is above the first output voltage level;
wherein the control circuitry is also for enabling the buck converter stage responsive to the voltage at the input terminal being above an input reference level;
wherein the control circuitry comprises:
a comparator, having a first input coupled to the input terminal, a second input coupled to the input reference voltage, and an output coupled to the buck converter stage, for enabling the buck converter stage responsive to the voltage at the input terminal being above the reference voltage at its second input.

2. The circuit of claim 1, wherein the charge pump stage comprises:
a switched diode-capacitor circuit coupled between the input terminal and the output terminal, and receiving a clock signal, responsive to which the switched diode-capacitor circuit operates.

3. A method of operating a DC-DC voltage converter to convert a DC voltage receive at an input terminal to a DC voltage at an output terminal, comprising the steps of:
applying clock signals to a charge pump circuit coupled between the input terminal and the output terminal, to increase the voltage at the output terminal;
responsive to the voltage at the output terminal exceeding a first voltage level, disabling the charge pump circuit; and
responsive to the voltage at the input terminal exceeding an input reference voltage, operating a buck converter stage to regulate the voltage at the output terminal at a second voltage level above the first voltage level;
comparing the voltage at the input terminal with the input reference voltage;
wherein the step of operating the buck converter stage comprises controlling switches in the buck converter stage responsive to the comparing step;
after the disabling step, and responsive to the voltage at the output terminal falling below the second voltage level, enabling the charge pump circuit.

4. The method of claim 3, further comprising:
limiting current applied to a diode chain in the charge pump circuit from the input terminal responsive to the voltage at the input terminal.

5. The method of claim 3, wherein the disabling step comprises:
comparing a voltage at a first node of a voltage divider coupled between the output terminal and a reference supply voltage to a first reference voltage; and
responsive to the voltage at the first node exceeding the first reference voltage, blocking the clock signals from being applied to the charge pump circuit.

6. A voltage converter circuit, comprising:
a buck converter stage coupled to an input terminal and to an output terminal, for driving a voltage at the output terminal responsive to an input voltage at the input terminal;
a charge pump stage, coupled to the input terminal and to the output terminal, for driving a voltage at the output terminal responsive to an input voltage at the input terminal; and
control circuitry, comprising:
a voltage divider comprised of a plurality of resistors connected in series between the output terminal and a reference supply voltage, and defining first and second nodes along the plurality of resistors, the first node closer to the output terminal than the second node;
a first comparator having a first input coupled to the first node and a second input coupled to a reference voltage, and having an output coupled to the charge pump stage for enabling and disabling the charge pump stage; and
a second comparator having a first input coupled to the second node and a second input coupled to a reference voltage, and having an output coupled to the buck converter stage;

a third comparator, having a first input coupled to the input terminal, a second input coupled to an input reference voltage, and an output coupled to the buck converter stage, for enabling the buck converter stage responsive to the voltage at the input terminal being above the reference voltage at its second input.

7. The circuit of claim 6, wherein the buck converter stage comprises:
a switching transistor connected between the input terminal and a switch node, the switch node coupled to a reference supply voltage;
an inductor coupled between the switch node and the output terminal;
a filter capacitor coupled across the output terminal and the reference supply voltage; and
control logic for controlling the switching transistor,
wherein the buck converter stage includes no switching transistor connected in series with the between the switch node and the output terminal.

* * * * *